(12) United States Patent
Yamami (10) Patent No.: US 8,807,589 B2
(45) Date of Patent: Aug. 19, 2014

(54) CASE MEMBER OF AIRBAG DEVICE

(71) Applicant: Nihon Plast Co., Ltd., Shizuoka (JP)

(72) Inventor: Akihiko Yamami, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 13/842,393

(22) Filed: Mar. 15, 2013

(65) Prior Publication Data

US 2013/0277950 A1    Oct. 24, 2013

(30) Foreign Application Priority Data

Apr. 23, 2012 (JP) ................................ 2012-097636

(51) Int. Cl.
*B60R 21/217* (2011.01)
*B60R 21/20* (2011.01)

(52) U.S. Cl.
USPC ...................................... 280/728.2; 280/731

(58) Field of Classification Search
USPC .................................. 280/728.1, 728.2, 731
See application file for complete search history.

(56) References Cited

U.S. PATENT DOCUMENTS

| | | | |
|---|---|---|---|
| 6,125,716 A * | 10/2000 | Hosoi et al. ..................... 74/552 |
| 6,675,675 B1 * | 1/2004 | Sauer et al. ...................... 74/552 |
| 8,087,691 B2 * | 1/2012 | Nebel et al. ................... 280/731 |
| 8,336,911 B2 * | 12/2012 | Hondier ........................ 280/731 |
| 2005/0012310 A1 * | 1/2005 | Rhea ............................. 280/731 |
| 2005/0082795 A1 * | 4/2005 | Visconti et al. ............. 280/728.2 |
| 2006/0220352 A1 * | 10/2006 | Clarke et al. ............... 280/728.2 |
| 2006/0220355 A1 * | 10/2006 | Yokoyama et al. ......... 280/728.3 |
| 2007/0164544 A1 * | 7/2007 | Fulmer et al. .............. 280/730.2 |
| 2007/0241541 A1 * | 10/2007 | Miwa et al. ................ 280/728.2 |
| 2008/0012269 A1 * | 1/2008 | Steinke ....................... 280/728.1 |
| 2008/0079244 A1 * | 4/2008 | Kato et al. .................. 280/728.3 |
| 2011/0074136 A1 * | 3/2011 | Honda et al. ............... 280/728.3 |
| 2011/0089672 A1 * | 4/2011 | Nebel et al. ................ 280/728.2 |

FOREIGN PATENT DOCUMENTS

| | | |
|---|---|---|
| JP | 2005-505462 A | 2/2005 |
| JP | 2011-255753 A | 12/2011 |
| JP | 2012-096609 A | 5/2012 |
| JP | 2012-176690 A | 9/2012 |

OTHER PUBLICATIONS

Search Report issued in corresponding GB Application No. 1305372.3 dated Aug. 28, 2013.

* cited by examiner

*Primary Examiner* — Paul N Dickson
*Assistant Examiner* — Barry Gooden, Jr.
(74) *Attorney, Agent, or Firm* — Arent Fox LLP (57) ABSTRACT

A base plate portion 21 directly receiving face pressure of the airbag is provided with a steel plate 31 made of a metal, and a stack portion 33 having a resin layers 32 made of synthetic resin and overlapping both faces of the steel plate 31. It possible to uniformly generate stress on both faces of the steel plate 31 in contraction at the time of molding while ensuring sufficient strength against the expansion pressure of the airbag, so that it is possible to suppress deformation in a cooling process after the molding and dimensional stability is high. The peripheral wall portion 22 is able to ensure sufficient strength even when it is integrally formed with each resin layer 32 of the base plate portion 21 in the form of a single layer.

7 Claims, 7 Drawing Sheets

CASE MEMBER OF AIRBAG DEVICE

CROSS REFERENCE TO RELATED APPLICATIONS

This application claims priority of Japanese Patent Application No. 2012-097636 filed on Apr. 23, 2012. The contents of this application are incorporated herein by reference in their entirety.

BACKGROUND OF THE INVENTION

1. Field of the Invention

The present invention relates to a case member of an airbag device that accommodates an airbag between the case member and a cover member, the airbag being inflated and expanded from a retracted state through the introduction of gas.

2. Description of the Related Art

Conventionally, for example, there has been known an airbag device provided in a steering wheel of a vehicle such as an automobile. Such an airbag device includes a back plate serving as a case member, an inflator mounted on the back plate, a retainer, an airbag, a cover member or the like.

The back plate uses a metal material. A steel plate is folded and is subject to a welding or deep drawing (press) process, or is subject to mold shaping of a light alloy (magnesium or aluminum), so that an open back plate shaped like a case is obtained.

However, since the back plate formed using the steel plate is heavy and the back plate formed using the light alloy requires high material cost and process cost and needs thickness setting or rib setting for obtaining strength, it is difficult to achieve sufficient lightness.

Therefore, in recent years, in order to achieve lightness, miniaturization, low cost or the like of an airbag device, there has been known an airbag device in which an entire back plate is formed of synthetic resin (for example, refer to Japanese Unexamined Patent Application Publication (Translation of PCT Application) No. 2005-505462 (page 5 and FIG. 1)). However, even in this configuration, since setting of ribs or the like is required in order to guarantee sufficient strength tolerant to the expansion of an airbag, it is not easy to achieve sufficient lightness. Furthermore, the back plate made of synthetic resin may be easily deformed (e.g., warped), after being pulled out from a mold, by internal residual stress in a forming process.

Meanwhile, there has also been known an airbag device in which most of a back plate is formed using a steel plate or the like and only a partial complicated molded component, in which a support body for allowing the back plate and a boss portion (a boss plate) to be engaged with each other, is disposed, is formed using synthetic resin (for example, refer to Japanese Laid-open Patent Application No. 2011-255753 (pages 4 to 6 and FIGS. 7 and 8)). However, in this configuration, it is possible to save a cost for a burr-finishing process or the like in a bending process and die-cast forming of the complicated molded component, but there is no large difference relative to an airbag device in which an entire back plate is formed using a steel plate, in terms of lightness.

As described above, light weight, low-cost, and stable dimension are demanded as a component used for a back plate of an airbag device.

SUMMARY OF THE INVENTION

The present invention has been made to solve the conventional problem described above, and it is an object of the present invention to provide a case member, of an airbag device, with light weight, low-cost, and superior dimensional stability.

In a first aspect of the present invention, a case member of an airbag device that accommodates an airbag between the case member and a cover member, the airbag being inflated and expanded from a retracted state through the introduction of gas, comprising:

a base plate portion including a core made of a metal and a stack portion having resin layers made of synthetic resin and overlapping both faces of the core; and a peripheral wall portion made of synthetic resin, integrally formed with each resin layer, rising from the peripheral edge of the base plate portion, and surrounding the airbag in the retracted state.

The case member of an airbag device according to second aspect of the present invention, wherein in the first aspect, the stack portion is formed with a circular opening into which an inflator for supplying gas into the airbag is inserted, and the each resin layer of the base plate portion and the peripheral wall portion are integrally formed with each other by resin material supplied along both faces of the core from a gate set on a peripheral face of the opening.

The case member of an airbag device according to third aspect of the present invention, wherein in the second aspect, the base plate portion and the peripheral wall portion have outer edges that are approximately line-symmetric with respect to a predetermined straight line passing through a center of the opening when viewed in plan, and the each resin layer of the base plate portion and the peripheral wall portion are integrally formed with each other by resin material supplied along both faces of the core from the gate set on the peripheral face of the opening to be line-symmetric with respect to the straight line.

According to the first aspect of the present invention, the base plate portion directly receiving the face pressure of the airbag is provided with the core made of a metal, and the stack portion having the resin layers made of synthetic resin and overlapping both faces of the core, so that it possible to uniformly generate stress on both faces of the core in contraction at the time of molding while ensuring sufficient strength against the expansion pressure of the airbag, so that it is possible to suppress deformation in a cooling process after the molding and dimensional stability is high. Furthermore, the peripheral wall portion not directly receiving the face pressure of the airbag is able to ensure sufficient strength even when it is integrally formed with each resin layer of the base plate portion in the form of a single layer, and for example, the case member can be configured to be lightweight at a low cost as compared with the case in which the whole of the back plate is made of a metal or the like.

According to the second aspect of the present invention, in addition to the effect of the case member of an airbag device of the first aspect, by the resin material supplied along both faces of the core from the gates set on the peripheral face of the circular opening provided to the stack portion, the resin layers and the peripheral wall portion of the base plate portion are integrally formed with each other, and the resin material flows along both faces of the core at the same time, so that it is possible to suppress warpage, distortion, or deflection of the core due to resin injection pressure, or contraction of the resin material by cooling, and it is possible to approximately uniformly form the resin layers on both faces of the core.

According to the third aspect of the present invention, in addition to the effect of the case member of the airbag device of the second aspect, when viewed in plan, the outer edges of the base plate portion and the peripheral wall portion are approximately line-symmetric with respect to a predetermined straight line passing through the center of the opening and the gates are set to be line-symmetric, so that the resin material supplied from the gates reaches the outer edges of the base plate portion and the peripheral wall portion almost at the same time, thereby enabling molding with small distortion as a whole and further improving temporal stability.

BRIEF DESCRIPTION OF THE DRAWINGS

FIG. 6 shows a part of a method of manufacturing the case member of the present embodiment, wherein FIG. 6(a) is a sectional view at a position corresponding to a gate and FIG. 6(b) is a sectional view at a position corresponding to the vicinity of the gate.

DESCRIPTION OF THE PREFERRED EMBODIMENTS

Hereinafter, an embodiment of a case member of an airbag device, according to the present invention, will be described referring to the drawings.

Figure 5:
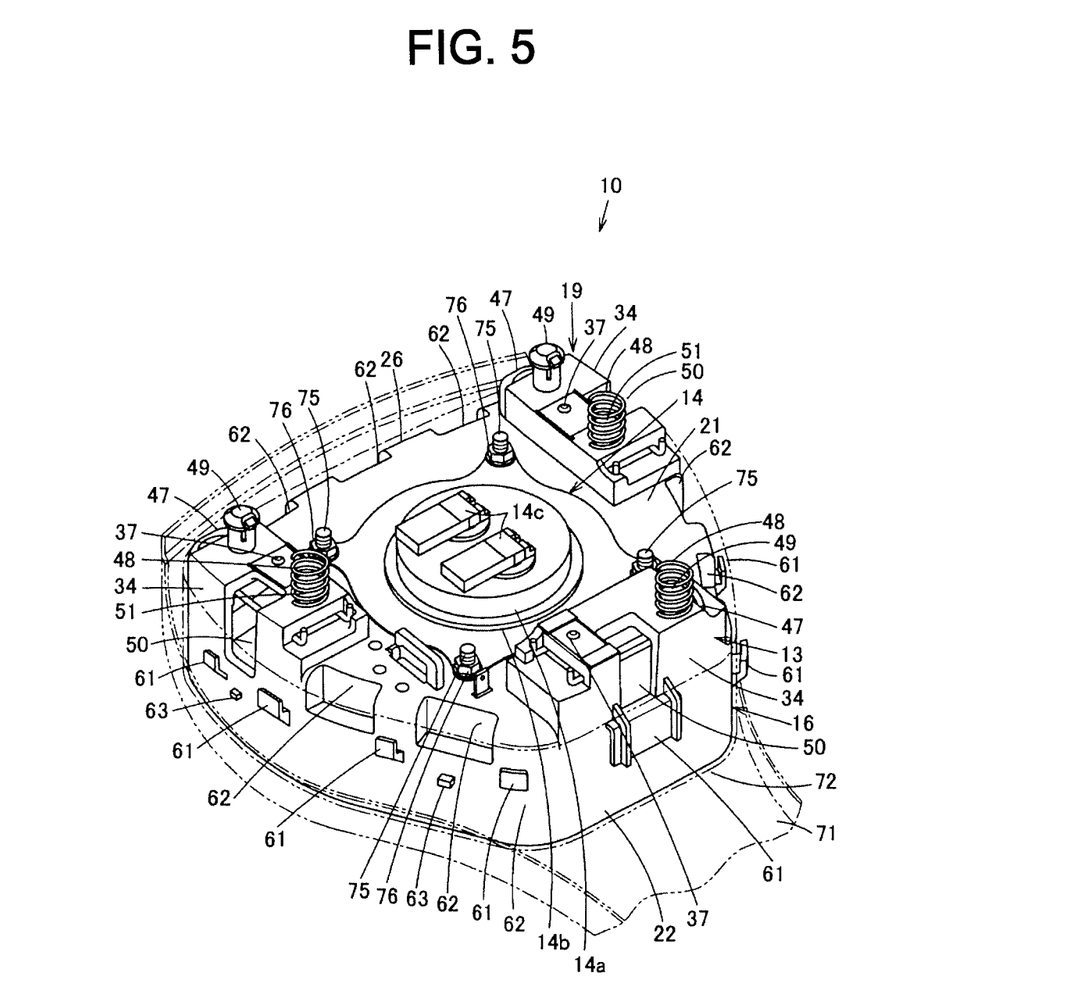
FIG. 5 is a perspective view showing an airbag device provided with the case member of the present embodiment.

In FIG. 5, reference numeral 10 designates an airbag device. This airbag device 10 is mounted at an occupant side of a steering wheel disposed in front of an occupant of a driver's seat of a vehicle such as an automobile.

The steering wheel, for example, includes a ring-like rim portion, a boss portion positioned at an inner side of the rim portion, and a plurality of spoke portions for linking the boss portion to the rim portion, and is mounted when a steering shaft as a controlling device (not shown) normally in an inclined state is fixed to the boss portion. Hereinafter, a direction such as a front and rear direction or an up and down direction will be described by setting the airbag device 10 side as an occupant side, a front side, or a back side, setting a steering shaft side as a vehicle body side, a rear side, or a foreside, setting a front and rear direction along the steering shaft as an axial direction, and setting a straight-ahead direction of a vehicle body provided with the steering wheel as a reference.

As shown in FIG. 1 to FIG. 7, the airbag device 10 includes a back plate 13 as a case member, an inflator 14 mounted on the back plate 13, an airbag (not shown), an airbag cover 16 as a cover member, a retainer (not shown), or the like. The back plate 13 and the airbag cover 16 constitute an accommodation device 19 of the airbag.

The back plate 13 is also called as a base plate or a back holder, and serves as a horn plate of a horn mechanism, and for example, is integrally injection-molded by synthetic resin such as nylon 6 (polyamide resin) containing glass fiber and is set to have stiffness higher than that of the airbag cover 16. Furthermore, the back plate 13 includes a base plate portion 21 as a case body, and a peripheral wall portion 22 rising on the front side and protruding over the whole of a peripheral portion of the surface side of the base plate portion 21.

The base plate portion 21 is formed to have a hexagonal shape including one and the other side portions 24 and 25, which are positioned facing the airbag cover 16, that is, the protruding direction of the airbag, and provided at upper sides of the right and left both sides, an upper side portion 26 provided at upper sides of the side portions 24 and 25 and continued to the side portions 24 and 25, a lower side portion 27 provided at lower sides of the side portions 24 and 25, and one and the other inclination side portions 28 and 29 provided at lower sides of the right and left both sides to link the lower side portion 27 to the side portions 24 and 25. Furthermore, in the base plate portion 21, the lower side portion 27 is shorter than the upper side portion 26 in the right and left width direction, and the inclination side portions 28 and 29 are inclined from the side portions 24 and 25 to the lower side portion 27, respectively. Moreover, the base plate portion 21 is injection-molded by inserting a steel plate 31, which is a metal plate as a reinforcing core, to be integrally formed with resin, wherein the steel plate 31 has a stack portion 33 covered by resin layers 32 and a plurality of, for example, three fixing portions 34 obtained by extending a portion of the steel plate 31, the stack portion 33 being integrally formed with the fixing portions 34.

Figure 4:
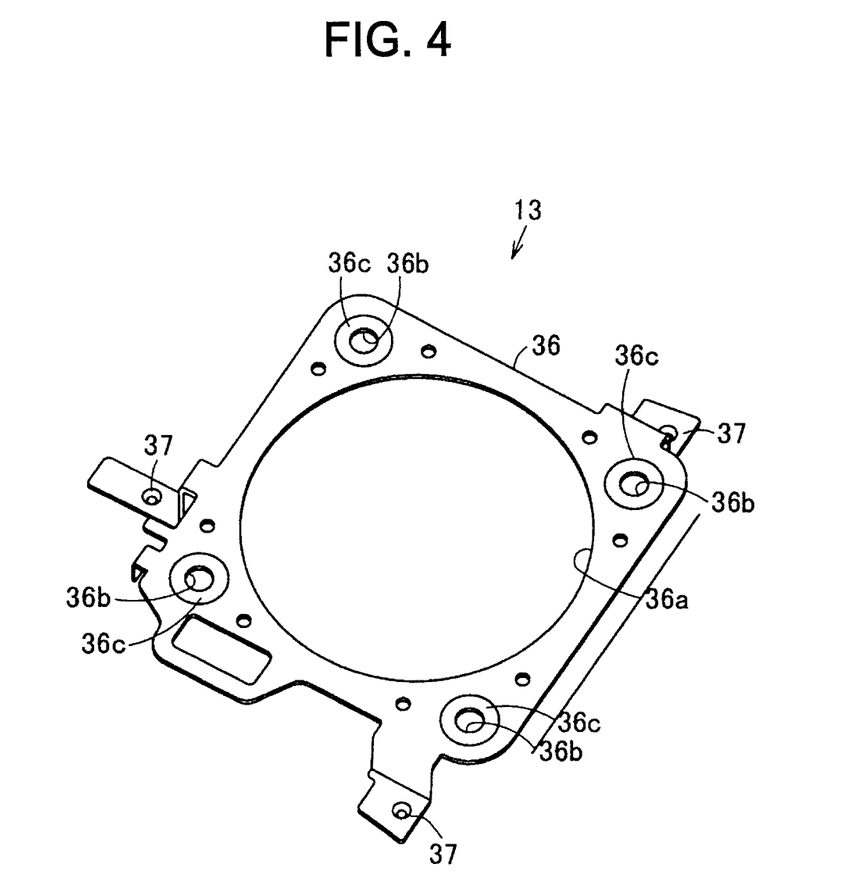
FIG. 4 is a perspective view showing a core of the case member of the present embodiment.

The steel plate 31, for example, has a thin plate shape of about 0.5 mm, and includes a steel plate body 36 as a rectangular core body, and a plurality of, for example, three movable contact portions 37 extending from the steel plate body 36, the steel plate body 36 being integrally formed with the moving contact portions 37.

The steel plate body 36 is formed at the central portion thereof with an opening 36a having a circular hole shape, and for example, four through holes 36b having a circular hole shape are formed around the opening 36a. The periphery of each through hole 36b serves as a fitting portion 36c swelling forward (toward a rear side). The fitting portion 36c has a planar shape in which a foreside of the fitting portion 36c is substantially flush with the resin layer 32.

Furthermore, each moving contact portion 37 is a protruding piece that protrudes from the steel plate body 36 in a tongue piece shape, is bent in the thickness direction with respect to the steel plate body 36 to protrude forward (toward the rear side), and extends toward the fixing portion 34. Moreover, tip end sides of the moving contact portions 37 are exposed to the tip end sides of the fixing portion 34, and face fixed contact portions of the horn mechanism disposed at the boss portion side, thereby constituting a horn switch together with the fixed contact portions.

Furthermore, each resin layer 32 covers both faces of the steel plate body 36 in at least the stack portion 33. In addition, covering both faces of the steel plate body 36 represents that each resin layer 32 covers a half or more of each area of both faces of the steel plate body 36, that is, covers most of the steel plate body 36, and does not always represent a configuration of covering both faces of the steel plate body 36 without exposing the whole of the steel plate body 36.

Furthermore, the stack portion 33 is positioned at approximately the central portion of base plate portion 21, and is formed at the central portion thereof with an inflator mounting hole 41 as an opening having a circular hole shape, wherein, for example, four mounting holes 42 are formed around the inflator mounting hole 41. Furthermore, at the surface side of the stack portion 33 of the base plate portion 21, that is, in the resin layer 32 at the protruding side of the peripheral wall portion 22, thinned wall portions 43 (a plurality of recesses) are provided for the purpose of lightness, wherein gaps among the thinned wall portions 43 serve as rib portions 44 for reinforcing the back plate 13.

The inflator mounting hole 41 is a portion into which the inflator 14 is inserted, and is formed by covering most of the inner circumferential edge of the opening 36a of the steel plate 31 by the resin layer 32. Accordingly, an inner diameter dimension R1 of the inflator mounting hole 41 is set to be slightly smaller than an inner diameter dimension R2 of the opening 36a (R2>R1).

Furthermore, the fitting portions 36c of the steel plate 31 are fitted into the mounting holes 42, and the through holes 36b are positioned to be exposed.

Furthermore, the fixing portion 34 is a portion by which the air bag device 10 is installed to the steering wheel in a retractable manner, and for example, are disposed corresponding to the positions of the bilateral side portions 24 and 25 and the lower side portion 27. Moreover, these fixing portions 34 are integrally formed with the resin layers 32 of the stack portion 33, and are mounted with wires 47 called one-touch wires and coil springs 48 as urging means, respectively. From the fixing portions 34 and 34 corresponding to the positions of the bilateral side portions 24 and 25, positioning protrusions 49 and 49 protrude to position the airbag device 10 in the up and down and right and left directions with respect to a cored bar of the steering wheel.

The wire 47 fixes the airbag device 10 to be detachable from the cored bar of the steering wheel, and is formed of an elastically deformable wire rod to be curved in a U shape. Furthermore, the wire 47 is guided to be pressed, and has both ends held in an exposed state from the fixing portion 34, wherein an intermediate portion of both ends is exposed from a cut-out opening 50 which is cut out by the fixing portion 34.

Furthermore, the coil spring 48 is used to urge the airbag device 10 to the front side with respect to the steering wheel, and is held in an urging means mounting portion 51 protruding from the fixing portion 34 toward the rear side.

Furthermore, the peripheral wall portion 22 surrounds a retracted airbag, is positioned in a direction along the protruding direction of the airbag, is integrally formed with the resin layer 32 of the stack portion 33 of the base plate portion 21, and is also called as a single layer portion made of only synthetic resin and having no core therein. Accordingly, in the back plate 13, most is made of synthetic resin and a portion is made of a metal. The peripheral wall portion 22 is formed to have an approximately hexagonal cylindrical shape having one and the other side plate portions 54 and 55 at an upper side of the right and left both sides corresponding to the side portions 24 and 25 of the base plate portion 21, an upper plate portion 56 at an upper side corresponding to the upper side portion 26 of the base plate portion 21, a lower plate portion 57 at a lower side corresponding to the lower side portion 27 of the base plate portion 21, and one and the other inclined plate portions 58 and 59 at a lower side of the right and left both sides corresponding to the inclination side portions 28 and 29 of the base plate portion 21. Moreover, the peripheral wall portion 22 is provided at an outer portion thereof with a plurality of hook portions 61, a plurality of engagement receiving portions 62, and a plurality of engaging pawl portions 63 for engaging and holding the airbag cover 16.

The hook portion 61 is formed in an L shape protruding from the outer face of the peripheral wall portion 22. A plurality of hook portions 61 are set to the bilateral side plate portions 54 and 55, the upper plate portion 56, and the bilateral inclined plate portions 58 and 59, respectively, and one hook portion 61 is set to the lower plate portion 57. In addition, the hook portions 61 set to the bilateral side plate portions 54 and 55, the upper plate portion 56, and the bilateral inclined plate portions 58 and 59 protrude in an opposite direction of the protruding direction of the peripheral wall portion 22, that is, protrude in the front direction, and the hook portion 61 set to the lower plate portion 57 protrudes in the protruding direction of the peripheral wall portion 22, that is, protrudes in the rear direction.

Furthermore, the engagement receiving portions 62 are recessed over the base plate portion 21 at positions of a proximal end side, that is, at positions of a front end side, more than the hook portions 61 of the peripheral wall portion 22, and are opened forward in the present embodiment. Moreover, each engagement receiving portion 62 is set between the hook portions 61 and 61 of the upper plate portion 56 and the inclined plate portions 58 and 59.

Furthermore, each engaging pawl portion 63 is set between the hook portions 61 and 61 of the side plate portions 54 and 55 and the inclined plate portions 58 and 59.

Figure 1:
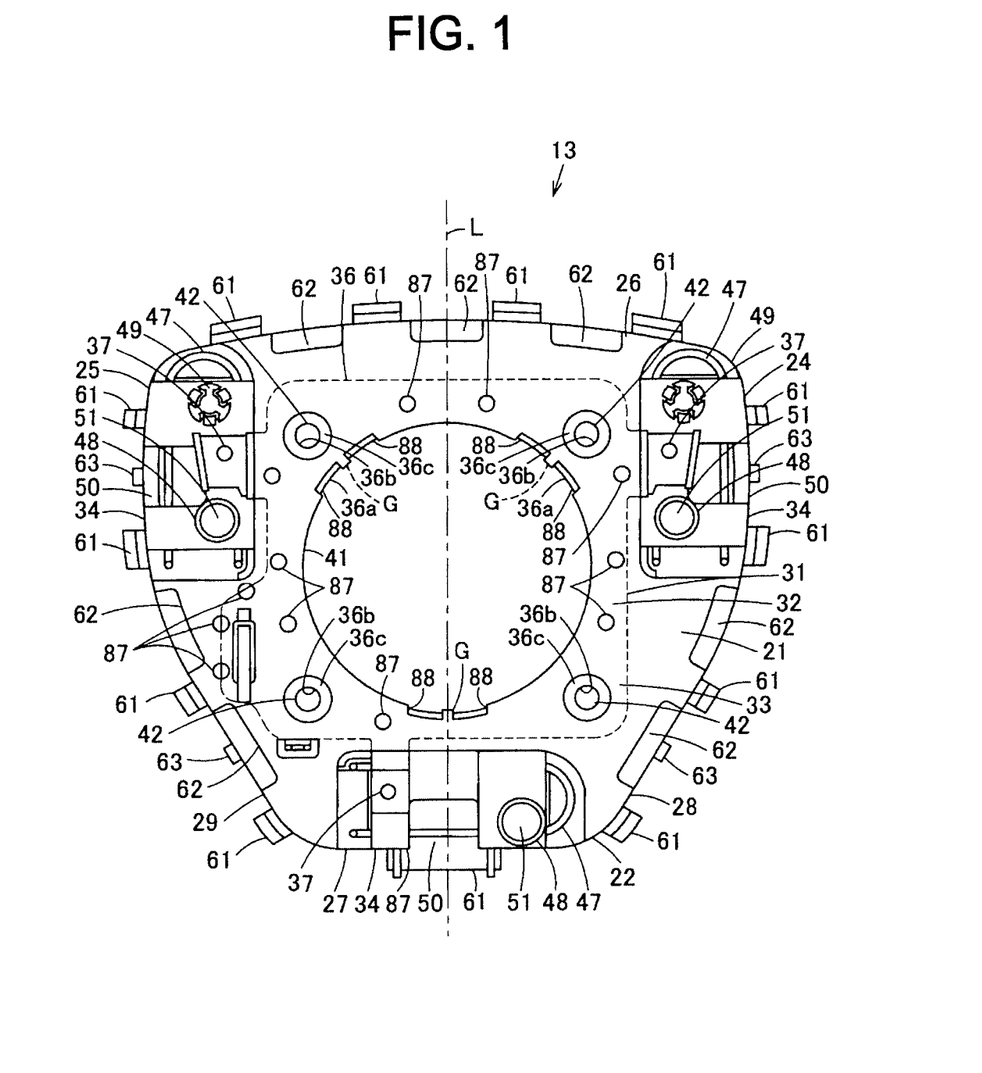
FIG. 1 is a plan view showing an embodiment of a case member of an airbag device of the present invention.
Figure 2:
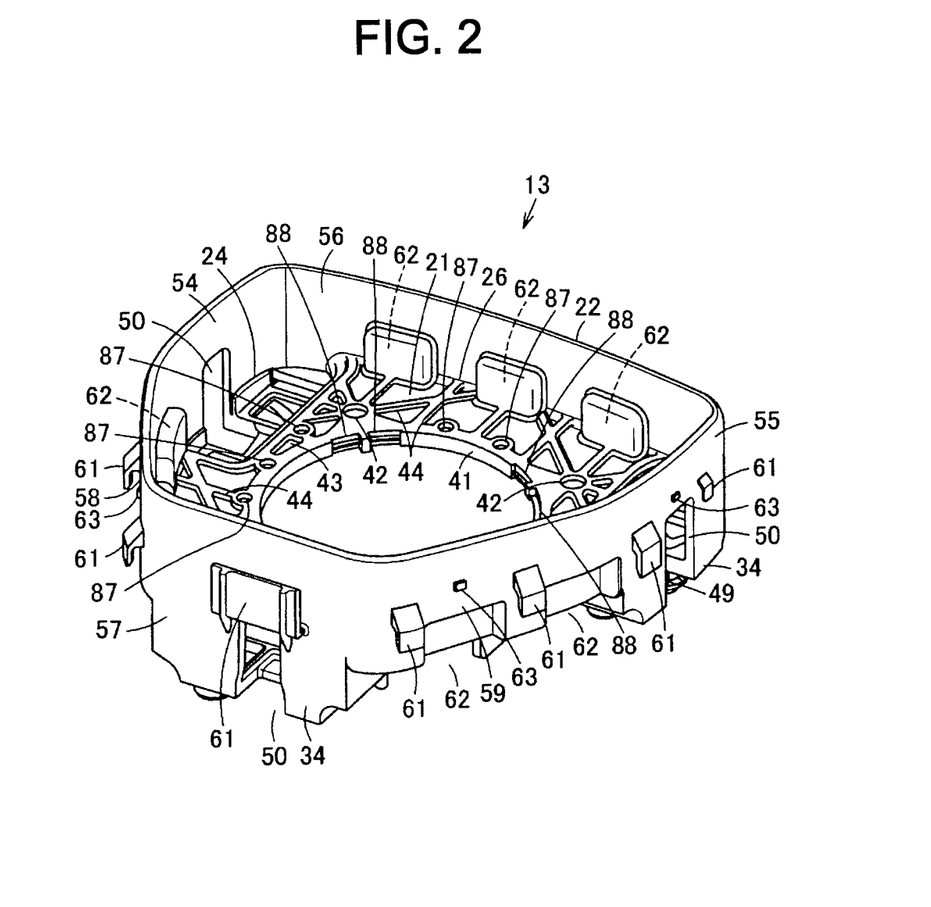
FIG. 2 is a perspective view in which the case member of the present embodiment is seen from the bottom.
Figure 3:
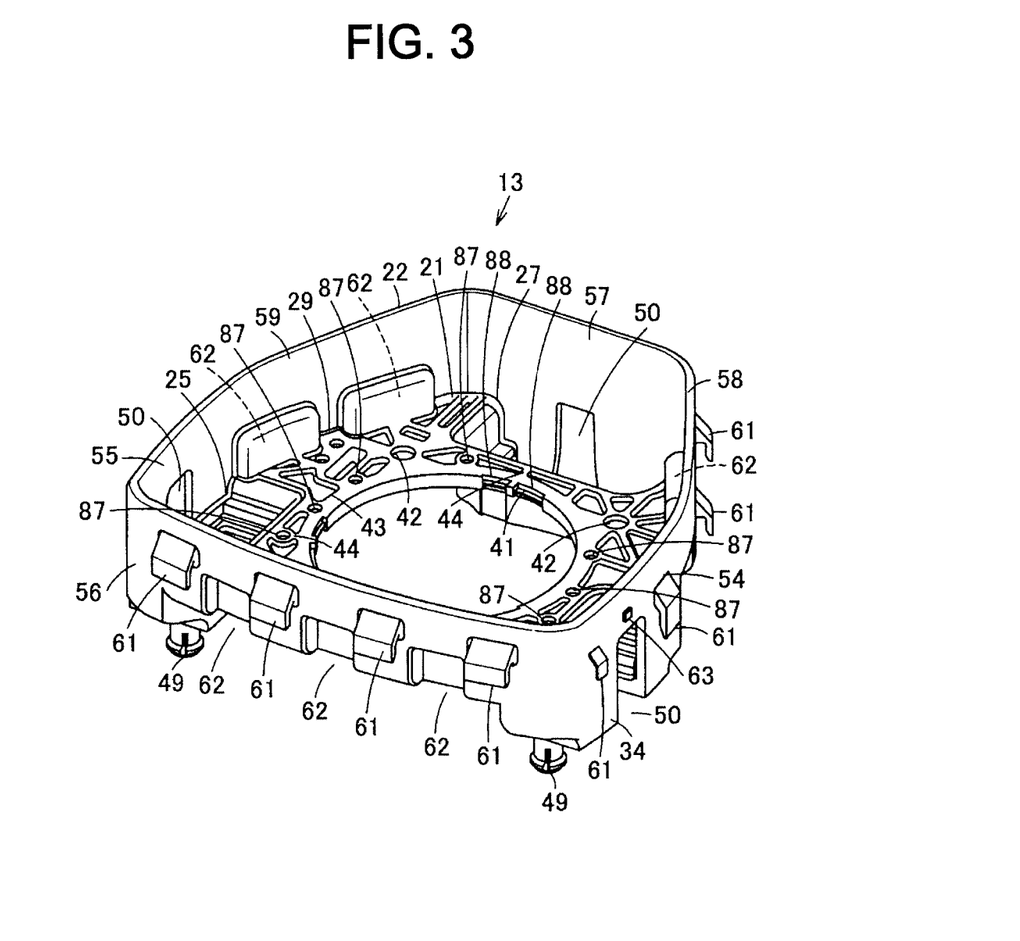
FIG. 3 is a perspective view in which the case member of the present embodiment is seen from the top.

In the back plate 13, when viewed in plan, the whole of the base plate portion 21 and the peripheral wall portion 22 is approximately line-symmetric, that is, is approximately bilaterally symmetric with respect to a predetermined straight line L along the up and down direction passing through the center of the inflator mounting hole 41, and particularly, outer edges of the base plate portion 21 and the peripheral wall portion 22 are approximately line-symmetric with respect to the straight line L. The approximate line symmetry with respect to the straight line L is assumed to indicate that at least a half or more (most) of an area is line-symmetric with respect to the straight line L.

Furthermore, the inflator 14 includes a disc-shaped inflator body 14a inserted into and engaged with the inflator mounting hole 41, and a flange portion 14b protruding from the disc-shaped inflator body 14a toward an outer peripheral side. Furthermore, the inflator body 14a is formed at the periphery thereof with a gas injection orifice (not shown), and the flange portion 14b is formed with four mounting holes (not shown) at positions corresponding to the mounting holes 42. Furthermore, the inflator body 14a is formed at the bottom part thereof with connectors 14c connected to a control device.

Furthermore, the airbag, for example, is formed by sewing the outer peripheries of two ground clothes with each other in a flat baggy shape, wherein one ground cloth is formed at the center thereof with an inflator mounting hole having a circular hole shape and four mounting holes provided to surround the inflator mounting hole, similarly to the base plate portion 21 of the back plate 13.

Furthermore, the airbag cover 16 is integrally formed using synthetic resin having an insulation property, and includes a surface plate portion 71 as a cover body that covers the front side of a part of the steering wheel, and a mounting plate portion 72 as a mounting wall portion protruding downward from the front face side, that is, the rear side of the surface plate portion 71, in a rectangular prism shape.

On the front serving as the rear of the surface plate portion 71, at a position surrounded by the mounting plate portion 72, a groove-like tear line (not shown) having a small thickness dimension, for example, is formed in an approximate H shape when viewed from the front, and the airbag is configured to be cleaved and expanded along the tear line at the time of expansion thereof.

Furthermore, since the mounting plate portion 72 is positioned outside the peripheral wall portion 22 of the back plate 13 in the state in which the accommodation device 19 is configured, the mounting plate portion 72 is formed in an approximate hexagonal cylindrical shape along the external profile of the peripheral wall portion 22. Moreover, although not shown in the drawings, the mounting plate portion 72 is provided with insertion openings into/with the hook portions 61 of the back plate 13 are inserted and engaged, locking protrusions engaged with the engagement receiving portions 62, and engaging recesses with which the engaging pawl portions 63 are engaged.

Furthermore, the retainer includes a retainer base (not shown) having a ring shape and formed using a metal plate or the like, and four mounting bolts 75 fixed to the retainer base. The retainer base is formed at the center thereof with an inflator mounting hole having a circular hole shape. Furthermore, the mounting bolts 75 protrude to the rear side while surrounding the inflator mounting hole, and are screwed into nuts 76, respectively.

Next, a method of manufacturing the back plate 13 will be described.

Figure 6:
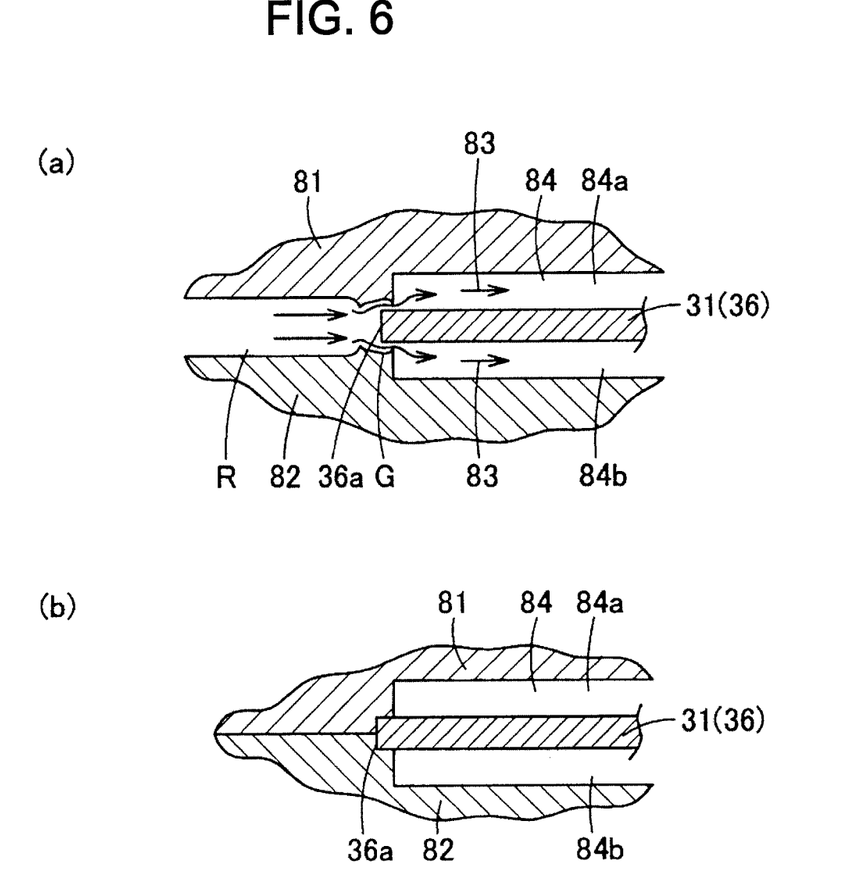

The back plate 13, for example, is subject to insert molding using molds 81 and 82 (FIG. 6(*a*) and FIG. 6(*b*)). These molds 81 and 82 form a space (cavity) 84, in which molten resin material 83 is filled, therebetween. In addition, in FIG. 6(*a*), arrows schematically indicate the flow of the resin material 83. Furthermore, in the molds 81 and 82, although not shown in the drawings, a plurality of positioning pins having a columnar shape or the like are disposed to support the steel plate 31 in the space 84, and for example, a movable piece for forming a portion having a complicated undercut shape not along the mold opening/closing direction, such as the fixing portion 34, is movably disposed while facing the space 84. Moreover, in the space 84, a plurality of, for example, three gates G, into which the resin material 83 is injected, are set. These gates G are positioned at the tip ends of runners R in the molds 81 and 82 in which the space 84 communicates with a nozzle of an injection mechanism (not shown), and are disposed at the center positions in the thickness direction of the steel plate 31 while facing the inner peripheral edge of the opening 36*a* of the steel plate body 36 of the steel plate 31. The runners R communicate with the nozzle of the injection mechanism via a sprue (not shown), and are radially formed along the diameter direction of the opening 36*a* from the center of the opening 36*a* of the steel plate body 36 of the steel plate 31 when viewed in plan. Moreover, these runners R and gates G are disposed in line-symmetry with respect to the straight line L, that is, disposed in bilateral symmetry when viewed in plan.

When manufacturing the back plate 13, firstly, the steel plate 31 formed in advance through press molding or the like is supported with each positioning pin, the molds 81 and 82 are closed to form the space 84, the periphery of the opening 36*a* is sandwiched by the molds 81 and 82 at the position in the vicinity (of both sides) of the gate G, so that the steel plate 31 is held in the space 84. In this state, the space 84 is segmented into the mold 81 side and the mold 82 side by the steel plate 31, thereby forming spaces 84*a* and 84*b* having approximately the same thickness along both faces of the steel plate 31.

In this state, by the injection mechanism, the molten resin material 83 is injected from the nozzle to the space 84 (the spaces 84*a* and 84*b*) via the sprue, the runner R, and the gate G, and is filled. At this time, the resin material 83 uniformly warms both faces of the surface face and the back face of the steel plate body 36 of the steel plate 31 while approximately uniformly flowing along the respective faces, thereby forming the resin layers 32 constituting the stack portion 33 of base plate portion 21, and approximately uniformly flows to the periphery of the stack portion 33 of base plate portion 21 and the peripheral wall portion 22 in the right and left direction, thereby reaching end terminals almost at the same time.

Then, in the molds 81 and 82, cooling water controlled at a predetermined water temperature flows through cooling channels (not shown) formed inside of the molds 81 and 82, so that a predetermined die temperature is controlled to be obtained even in continuous shot molding in mass-production molding, the resin material 83 injected at a high temperature and filled in the space 84 is deprived of the heat by contact faces of the molds 81 and 82 thereby to be cooled, and thus the resin material 83 is solidified. Thereafter, the molds 81 and 82 are opened and the back plate 13 is released by a protruding device (not shown). The base plate portion 21 of the back plate 13 is formed on the surface face and the back face thereof with exposure openings 87, through which the steel plate body 36 is exposed, at portions supported with the positioning pins, and cut-out portions 88 are formed at edge parts of the opening 36*a* sandwiched by the molds 81 and 82. Then, (the sprue and) the runner R remaining at the position of each gate G is cut down and removed, so that the back plate 13 is completed. In this state, a distance R3 from the center of the inflator mounting hole 41 to each gate G is equal to or less than an inner diameter dimension R1 of the inflator mounting hole 41 (R1≥R3).

Then, the airbag device 10 is configured by mounting the wires 47 and the coil springs 48 in the completed back plate 13, and mounting the inflator 14, the airbag, the airbag cover 16, the retainer or the like therein.

Furthermore, in the state in which the retainer is inserted into an inner side of the airbag and the mounting bolts 75 of the retainer are pulled out from the mounting holes, the airbag is retracted in a predetermined shape. Moreover, the back plate 13 is inserted into the airbag cover 16 put on the retracted airbag. That is, the peripheral wall portion 22 of the back plate 13 is inserted into the inner side of the mounting plate portion 72 of the airbag cover 16, and the back plate 13 is pushed into the airbag cover 16 side. As a consequence, tip ends of the hook portions 61 are inserted into the insertion openings and the locking protrusions are inserted into the engagement receiving portions 62, so that the airbag cover 16 and the back plate 13 are directly mounted and fixed in a one-touch (snap-in).

Thereafter, while the mounting bolts 75 of the retainer are being inserted into the mounting holes 42, the airbag, the retainer, and the airbag cover 16 are combined with the back plate 13.

Figure 7:
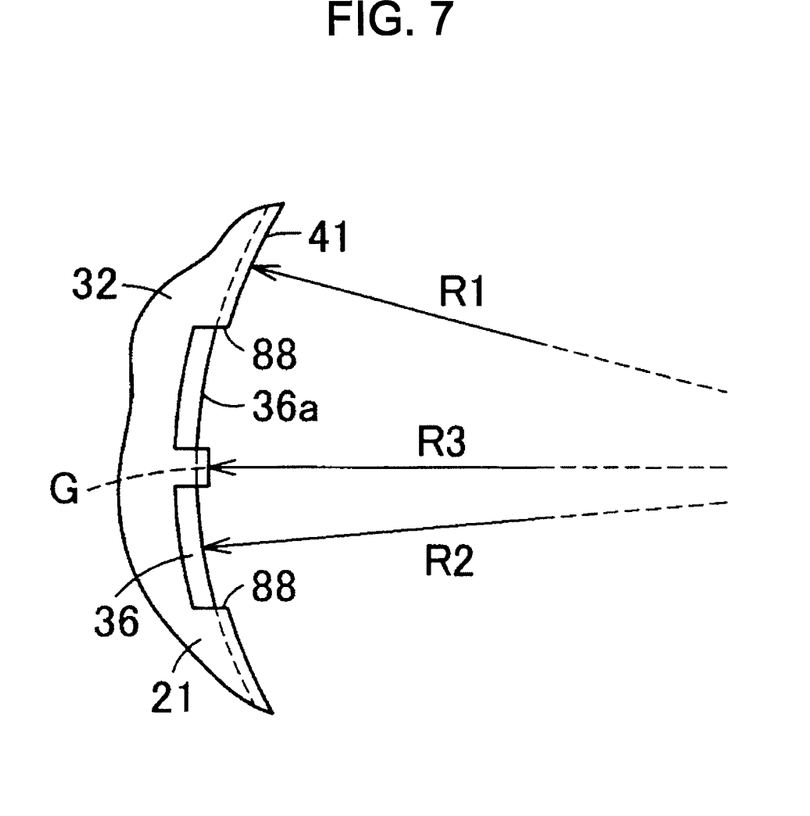
FIG. 7 is an enlarged plan view of a part of the case member of the present embodiment.

Moreover, while the mounting bolts 75 protruding to the rear side of the back plate 13 are being inserted into the mounting holes, the inflator 14 is combined from the rear side of the back plate 13 and the nuts 76 are screwed around the mounting bolts 75 for coupling. In this state, a portion of the front side of the inflator body 14*a* formed with the gas injection orifice of the inflator 14 is inserted into the inner side of the airbag from the inflator mounting hole 41, so that the airbag device 10 is configured. At this time, since the distance R3 from the center of the inflator mounting hole 41 to each gate G is equal to or less than the inner diameter dimension R1 of the inflator mounting hole 41, uncut portions at the positions of the gates G are not interfered with the outer periphery of the inflator body 14*a* of the inflator 14 (FIG. 7).

Then, if the airbag device 10 is pushed in the steering wheel from the front side, the airbag device 10 is mounted in a one-touch in such a manner that the positioning protrusions 49 of the fixing portions 34 are inserted into and fixed to the boss portion side and thus the airbag device 10 is positioned in the right and left direction and the up and down direction, and the engaging portions of the steering wheel side are engaged with the wires 47 and thus the airbag device 10 is engaged with and supported by the steering wheel at three places of both sides and the lower side so that the engagement is ensured.

Moreover, an electrical wiring is made, so that the steering wheel provided with the airbag device 10 is configured in the state in which the steering wheel is mounted on the steering shaft.

Then, an occupant of a driver's seat grips and rotates the rim portion, so that the steering wheel configured above is subject to a running operation. Furthermore, the occupant presses the airbag cover 16, which functions also as a pressing portion, of the airbag device 10 against the urging force of the coil springs 48, so that electrical conduction occurs between the moving contact portions 37 and the fixed contact portions and thus the horn device of the vehicle body sounds.

Furthermore, for example, in the case of a head-on collision or the like of a vehicle, gas is rapidly injected into the airbag from the inflator 14, so that the retracted and accommodated airbag is rapidly expanded. At this time, in the back plate 13, the base plate portion 21 (the stack portion 33) receives face pressure of the airbag expansion and the peripheral wall portion 22 receives tension in the plane direction. Then, by the pressure of the expansion of the airbag, a portion of the airbag cover 16 is cleaved along the tear line to form a protrusive opening of the airbag, and the airbag protrudes from the protrusive opening to be inflated and expanded in front of an occupant, so that the occupant is constrained and protected.

As described above, according to the present embodiment, the base plate portion 21 directly receiving the face pressure of the airbag is provided with the steel plate 31 made of a metal, and the stack portion 33 having the resin layers 32 made of synthetic resin and overlapping both faces of the steel plate 31, so that it is possible to uniformly generate stress on both faces of the core in contraction at the time of molding while ensuring sufficient strength against the expansion pressure of the airbag without an increase in the weight due to an excessive thickness of the base plate portion 21 more than necessary. Consequently, it is possible to suppress deformation in a cooling process after the molding and to suppress deformation such as warpage to one side at the time of thermal expansion, so that dimensional stability is high.

Furthermore, the peripheral wall portion 22 receiving the tension in the plane direction without directly receiving the face pressure of the airbag is able to ensure sufficient strength even when it is integrally formed with each resin layer 32 of the base plate portion 21 in the form of a single layer, and for example, the case member according to the present invention can be configured to be lightweight at a low cost as compared with the case in which the whole of the back plate 13 is made of a metal or the like.

Moreover, by the resin material 83 supplied along both faces of the steel plate 31 from the gates G set on the peripheral face of the circular inflator mounting hole 41 provided to the stack portion 33, the resin layers 32 and the peripheral wall portion 22 of the base plate portion 21 are integrally formed with each other, and the resin material 83 flows along both faces of the steel plate 31 at the same time, so that it is possible to suppress warpage, distortion, or deflection of the steel plate 31 due to resin injection pressure, or contraction of the resin material 83 by cooling, and it is possible to approximately uniformly form the resin layers 32 on both faces of the steel plate 31. Furthermore, the deformation of the steel plate 31 is suppressed, so that it is possible to improve fluidity of the resin material 83 when the resin material 83 is injected into the space 84 (the spaces 84a and 84b).

Particularly, the outer edges of the base plate portion 21 and the peripheral wall portion 22 are approximately line-symmetric with respect to a predetermined straight line L passing through the center of the inflator mounting hole 41 and the gates G are set to be line-symmetric, so that the resin material 83 supplied from the gates G reaches end terminals, which are the outer edges of the base plate portion 21 and the peripheral wall portion 22, almost at the same time, and it is not necessary to apply excessive retaining pressure to a place filled with the resin material 83 in advance in order to compensate for filling delay of right or left resin material 83, thereby enabling molding with small distortion as a whole and further improving temporal stability.

Moreover, the front and the back of the base plate portion 21 are coated with resin, so that an edge part, which may occur by a process such as punching of the steel plate 31, can be also coated with the resin and can be prevented from making contact with the retracted airbag, the metallic boss portion (the boss plate) of the steering wheel can be electrically isolated, and noise, such as creak occurring by vibration or the like in a light contact state of metals, can be suppressed, hence preferable.

In addition, in the embodiment, as the core, an appropriate metallic member such as a duralumin plate or a brass sheet may be used, in addition to the steel plate 31.

Furthermore, the shapes and detailed structures of the base plate portion 21 and the peripheral wall portion 22 are not limited to the embodiment. For example, the hook portion 61 of the peripheral wall portion 22 may be removed if the engaging structure with the airbag cover 16 is set to another member.

INDUSTRIAL APPLICABILITY

The present invention is applicable to an airbag device for an occupant of a driver's seat provided in the steering wheel of an automobile, for example.

What is claimed is:

1. A case member of an airbag device that accommodates an airbag between the case member and a cover member, the airbag being inflated and expanded from a retracted state through an introduction of gas, comprising:
   a base plate portion including a plate-shaped core layer made of a metal and a stack portion having resin layers made of synthetic resin and overlapping both faces of the core layer; and
   a peripheral wall portion made of the synthetic resin, integrally formed with the resin layers, rising from a peripheral edge of the base plate portion, and surrounding the airbag in the retracted state;
   wherein the core layer inside the base plate portion has a fitting portion to be fitted into a side of the airbag device, and the fitting portion of the core layer is formed in a manner to swell from a surface of the core layer so as to be exposed from the stack portion, and is configured to have a planar shape that is substantially flush with the resin layers.

2. The case member of the airbag device according to claim 1, wherein the stack portion is provided in approximately a central portion of the base plate portion, subjected to an expansion pressure of the airbag.

3. The case member of the airbag device according to claim 1, wherein the core layer is formed to have a rectangular shape, and an opening having a circular hole shape is formed at a center of the core layer.

4. The case member of the airbag device according to claim 1, wherein the core layer is configured so that the resin layers cover a half or more of each area of the both faces of the core layer.

5. The case member of the airbag device according to claim 1, wherein the resin layers are approximately uniformly formed on the both faces of the core layer.

6. The case member of the airbag device according to claim 1, wherein the stack portion is formed with a circular opening into which an inflator for supplying the gas into the airbag is inserted, and the resin layers of the base plate portion and the peripheral wall portion are integrally formed with each other by resin material supplied along the both faces of the core layer from a gate set on a peripheral face of the opening.

7. The case member of the airbag device according to claim 6, wherein the base plate portion and the peripheral wall portion have outer edges that are approximately line-symmetric with respect to a predetermined straight line passing through a center of the opening when viewed in plan, and the resin layers of the base plate portion and the peripheral wall portion are integrally formed with each other by the resin material supplied along the both faces of the core layer from the gate set on the peripheral face of the opening to be line-symmetric with respect to the straight line.

* * * * *